(12) United States Patent
Lee et al.

(10) Patent No.: US 9,996,966 B2
(45) Date of Patent: Jun. 12, 2018

(54) RAY TRACING METHOD AND APPARATUS

(71) Applicant: Samsung Electronics Co., Ltd., Suwon-si (KR)

(72) Inventors: Won-jong Lee, Seoul (KR); Young-sam Shin, Hwaseong-si (KR); Jae-don Lee, Yongin-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 614 days.

(21) Appl. No.: 14/276,280

(22) Filed: May 13, 2014

(65) Prior Publication Data

US 2015/0123971 A1 May 7, 2015

(30) Foreign Application Priority Data

Nov. 4, 2013 (KR) .................. 10-2013-0132995

(51) Int. Cl.
 *G06T 15/06* (2011.01)
(52) U.S. Cl.
 CPC .......... *G06T 15/06* (2013.01); *G06T 2200/04* (2013.01)
(58) Field of Classification Search
 USPC ........................................................ 345/426
 See application file for complete search history.

(56) References Cited

U.S. PATENT DOCUMENTS

| | | | |
|---|---|---|---|
| 8,203,559 B2 | 6/2012 | Peterson et al. | |
| 8,248,401 B2* | 8/2012 | Fowler | G06T 15/06 345/418 |
| 8,248,412 B2* | 8/2012 | Fowler | G06T 15/06 345/418 |
| 8,350,846 B2* | 1/2013 | Mejdrich | G06T 15/06 345/418 |
| 8,692,825 B2* | 4/2014 | Mejdrich | G06T 15/06 345/419 |
| 8,930,636 B2* | 1/2015 | McCormack | G06F 12/0815 711/119 |
| 9,270,965 B2* | 2/2016 | Sandrew | H04N 9/79 |
| 2008/0024489 A1 | 1/2008 | Shearer | |
| 2009/0167763 A1* | 7/2009 | Waechter | G06T 15/06 345/426 |
| 2009/0322752 A1* | 12/2009 | Peterson | G06T 15/06 345/426 |

(Continued)

FOREIGN PATENT DOCUMENTS

| | | |
|---|---|---|
| JP | 2010-176663 A | 8/2010 |
| KR | 10-0894136 B1 | 4/2009 |

OTHER PUBLICATIONS

Dietrich, Andreas, et al. "Adaptive spatial sample caching." 2007 (7 pages, in English).

(Continued)

*Primary Examiner* — Kimbinh T Nguyen
(74) *Attorney, Agent, or Firm* — F. Chau & Associates, LLC

(57) ABSTRACT

A ray tracing method includes determining whether acceleration structure traversal data of a previous ray similar to a received ray is stored in a traversal cache, and reading the stored acceleration structure traversal data, and performing image rendering based on the read acceleration structure traversal data, based on a result of the determining.

23 Claims, 9 Drawing Sheets

(56) References Cited

U.S. PATENT DOCUMENTS

| | | | |
|---|---|---|---|
| 2011/0050698 A1* | 3/2011 | Peterson | G06T 15/005 |
| | | | 345/426 |
| 2011/0285710 A1* | 11/2011 | Mejdrich | G06T 15/06 |
| | | | 345/426 |
| 2012/0081368 A1* | 4/2012 | Park | G06T 15/005 |
| | | | 345/426 |
| 2013/0016109 A1 | 1/2013 | Garanzha | |
| 2014/0354646 A1* | 12/2014 | Baldwin | G06T 1/60 |
| | | | 345/426 |
| 2015/0262407 A1* | 9/2015 | Fursund | G06T 15/80 |
| | | | 345/426 |

OTHER PUBLICATIONS

N. A. Carr, et al., "The Ray Engine," *Graphics Hardware*, The Eurographics Association, 2002, pp. 37-46.

E. Mansson, et al., "Deep Coherent Ray Tracing," *IEEE Symposium on Interactive Ray Tracing*, Sep. 10-12, 2007, Ulm, Germany, pp. 79-85.

M. Hapala, et al., "Review: Kd-tree Traversal Algorithms for Ray Tracing," *Computer Graphics forum*, vol. 30, No. 1, 2011, pp. 199-213.

Extended European Search Report dated Jan. 5, 2016, in counterpart European Application No. 14188967.5 (6 pages, in English).

* cited by examiner

N-th FRAME
(a)

(N+1)-th FRAME
(b)

RAY TRACING METHOD AND APPARATUS

CROSS-REFERENCE TO RELATED APPLICATION

This application claims the benefit under 35 USC 119(a) of Korean Patent Application No. 10-2013-0132995, filed on Nov. 4, 2013, in the Korean Intellectual Property Office, the entire disclosure of which is incorporated herein by reference for all purposes.

BACKGROUND

1. Field

The following description relates to a ray tracing method and a ray tracing apparatus.

2. Description of Related Art

Generally, 3-dimensional (3D) rendering is an image process of synthesizing 3D object data of an image seen from a given camera viewpoint. Examples of rendering methods include rasterization wherein an image is generated while projecting a 3D object on a screen, and ray tracing wherein an image is generated by tracing a path of light through each pixel in an image plane.

When ray tracing is used, a high quality image can be rendered since the physical properties (reflection, refraction, and penetration) of light are reflected on a rendering result. However, it is difficult to use ray tracing for high speed rendering due to a large number of operations required for generation and traversal (TRV) of an acceleration structure (AS) in which scene objects to be rendered are spatially split and for performing an intersection test (IST) between a ray and a primitive.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a ray tracing method including determining whether acceleration structure traversal data of a previous ray similar to a received ray is stored in a traversal cache, and reading the stored acceleration structure traversal data, and performing image rendering based on the read acceleration structure traversal data, based on a result of the determining.

The ray tracing method may further include determining that the previous ray is similar to the received ray based on feature information of the received ray, the feature information including an origin and a direction of the received ray.

The ray tracing method may further include extracting feature information of the received ray, and determining a key of the received ray based on the extracted feature information.

The determining of the key may include determining a group to which the received ray belongs by searching, based on the extracted feature information, a database in which information of groups set based on feature information of rays, and keys of the groups, are stored, and determining a key of the determined group as the key of the received ray.

The feature information of the received ray may include an origin and a direction of the received ray. The information of the groups may include an origin and a direction of each of the rays. The determining of the key may include determining the group to which the received ray belongs by comparing the origin and the direction of the received ray with the origin and the direction of each of the rays.

The determining of whether the acceleration structure traversal data is stored may include comparing the key of the received ray with tag data stored in the traversal cache and indicating a key of a ray. The reading may include, in response to the tag data matching the key of the received ray, reading the acceleration structure traversal data corresponding to the matching tag data.

The acceleration structure traversal data may include at least one of data of a node cluster where the previous ray intersects, data of a leaf node where the previous ray intersects, and data of a primitive where the previous ray intersects.

In response to the acceleration structure traversal data including the data of the node cluster, the image rendering may include detecting a leaf node where the received ray intersects by traversing nodes included in the node cluster.

In response to the acceleration structure traversal data including the data of the leaf node, the rendering may include testing whether the received ray intersects the leaf node.

The ray tracing method may further include, in response to the acceleration structure traversal data including the data of the primitive, transmitting the data of the primitive to an intersection test unit.

In response to the acceleration structure traversal data including the data of the primitive, the rendering may include testing whether the received ray intersects the primitive.

In another general aspect, there is provided a ray tracing apparatus including a traversal cache configured to determine whether acceleration structure traversal data of a previous ray similar to a received ray is stored in the traversal cache, and a traversal operation unit configured to read the stored acceleration structure traversal data, and perform acceleration structure traversal with the received ray based on the read acceleration structure traversal data, based on a result of the determination.

The ray tracing apparatus may further include a key determination unit configured to determine that the previous ray is similar to the received ray based on feature information of the received ray, the feature information including an origin and a direction of the received ray.

The ray tracing apparatus may further include a key determination unit configured to extract feature information of the received ray, and determine a key of the received ray based on the extracted feature information.

The key determination unit may include a database in which information of groups set based on feature information of rays, and keys of the groups, are stored. The key determination unit may be configured to determine a group to which the received ray belongs by searching the database based on the extracted feature information, and determine a key of the determined group as the key of the received ray.

The feature information of the received ray may include an origin and a direction of the received ray. The information of the groups may include an origin and a direction of each of the rays. The key determination unit may be configured to determine the group to which the received ray belongs by comparing the origin and the direction of the received ray with the origin and the direction of each of the rays.

The traversal cache may be configured to store tag data indicating a key of a ray, and acceleration structure traversal data corresponding to the tag data, compare the key of the received ray with the stored tag data, and the traversal operation unit may be configured to read the acceleration structure traversal data corresponding to the matching tag data in response to the tag data matching the key of the received ray.

In response to the acceleration structure traversal data including the data of the node cluster, the traversal operation unit may be configured to traverse nodes included in the node cluster to detect a leaf node where the received ray intersects.

In response to the acceleration structure traversal data including the data of the leaf node, the traversal operation unit may be configured to test whether the received ray intersects the leaf node.

The ray tracing apparatus may further include an intersection test operation unit configured to test whether the received ray intersects the primitive in response to the acceleration structure traversal data including the data of the primitive.

Other features and aspects will be apparent from the following detailed description, the drawings, and the claims.

Figure 1:
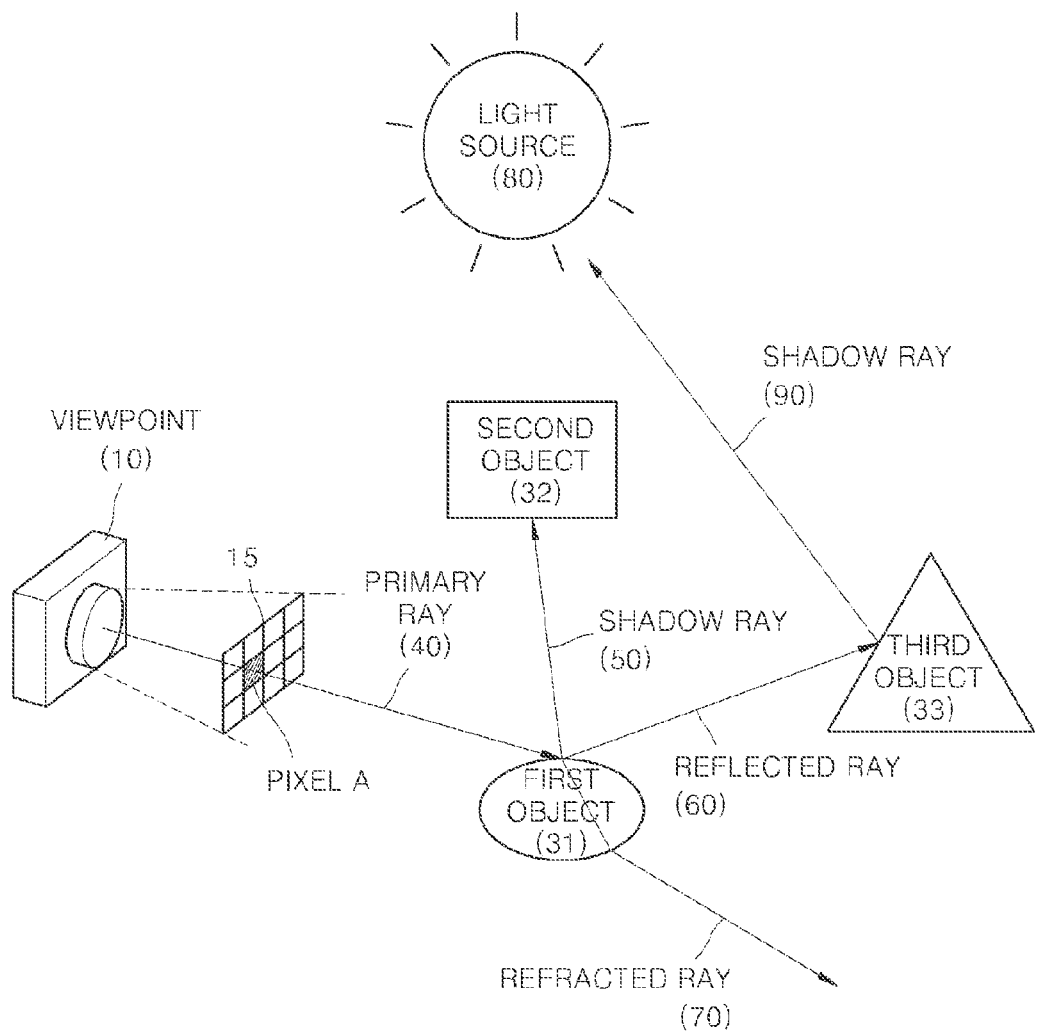
FIG. 1 is a diagram illustrating a general ray tracing method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 is a diagram illustrating a general ray tracing method. FIG. 1 shows 3-dimensional (3D) modeling including a light source 80, a first object 31, a second object 32, and a third object 33. The first through third objects 31 through 33 are 3D objects, but are shown as 2D objects in FIG. 1 for convenience of description. In FIG. 1, reflectivity and refractive indices of the first object 31 are greater than 0, and reflectivity and refractive indices of the second and third objects 32 and 33 are 0. In other words, the first object 31 reflects and refracts light, whereas the second and third objects 32 and 33 neither reflect nor refract light.

In the 3D modeling shown in FIG. 1, a rendering apparatus, such as a ray tracing apparatus, may determine a viewpoint 10 to generate a 3D image, and also determine a screen 15 according to the determined viewpoint 10. After the viewpoint 10 and the screen 15 are determined, the apparatus may generate a ray with respect to each pixel of the screen 15 from the viewpoint 10. For example, as shown in FIG. 1, when a resolution of the screen 15 is 4×3, a ray may be generated with respect to each of 12 pixels. Hereinafter, only a ray with respect to one pixel, i.e., a pixel A, will be described.

Referring to FIG. 1, a primary ray 40 is generated with respect to the pixel A from the viewpoint 10. The primary ray 40 passes through a 3D space, and reaches the first object 31. The first object 31 may be formed of a group of uniform unit areas called primitives. For example, a primitive may be polygonal, such as triangular or rectangular. Hereinafter, it is assumed that the primitive is triangular.

A shadow ray 50, a reflected ray 60, and a refracted ray 70 are generated at a hit point of the primary ray 40 and the first object 31. The shadow ray 50, the reflected ray 60, and the refracted ray 70 are also referred to as secondary rays. The shadow ray 50 is generated in a direction from the hit point to the light source 80. The reflected ray 60 is generated in a direction corresponding to an incidence angle of the primary ray 40, and is used in conjunction with a weight according to the reflectivity index of the first object 31. The refracted ray 70 is generated in a direction corresponding to the incidence angle of the primary ray 40 and the refractive index of the first object 31, and is used in conjunction with a weight according to the refractive index of the first object 31.

The apparatus may determine whether the hit point is exposed to the light source 80 through the shadow ray 50. For example, as shown in FIG. 1, when the shadow ray 50 meets the second object 32, a shadow is generated at the hit point where the shadow ray 50 is generated. Also, the apparatus may determine whether the refracted ray 70 and the reflected ray 60 reach another object. For example, as shown in FIG. 1, no object exists in a proceeding direction of the refracted ray 70, and the reflected ray 60 reaches the third object 33. Accordingly, the apparatus may determine coordinate and color information of a hit point of the third object 33, and a shadow ray 90 is generated from the hit point of the third object 33. In this example, the apparatus may determine whether the shadow ray 90 is exposed to the light source 80. Meanwhile, since the reflectivity and refractive indices of the third object 33 are 0, a reflected ray and a refracted ray with respect to the third object 33 are not generated.

As described above, the apparatus may analyze the primary ray 40 of the pixel A and all rays derived from the primary ray 40, and may determine a color value of the pixel A based on a result of the analyzing. The color value of the pixel A may be determined based on a color of the hit point of the primary ray 40, a color of the hit point of the reflected ray 60, and whether the shadow ray 50 reaches the light source 80. The apparatus may perform all above operations on all pixels of the screen 15.

Figure 2:
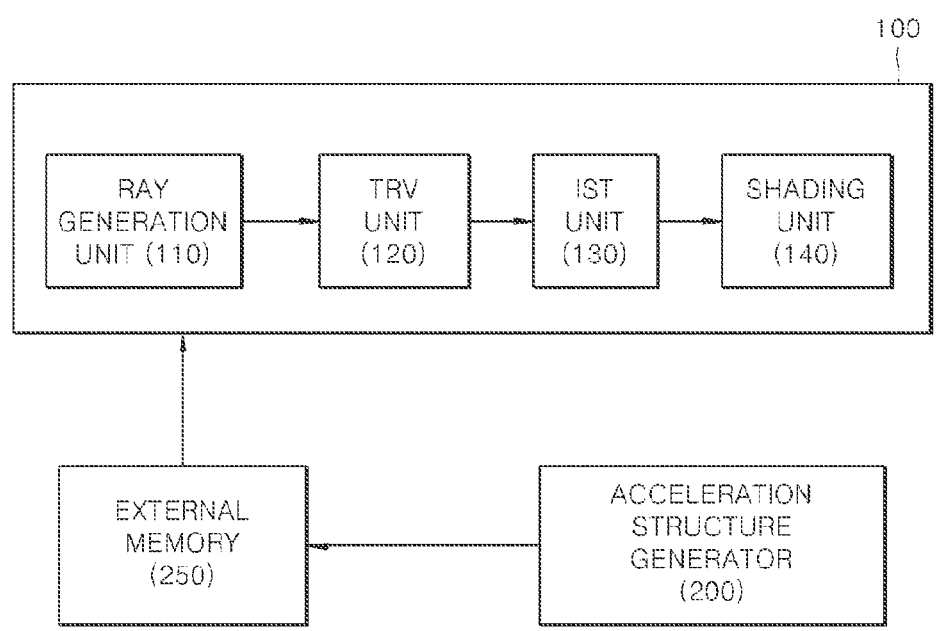
FIG. 2 is a block diagram illustrating an example of a ray tracing system.

FIG. 2 is a block diagram illustrating an example of a ray tracing system. Referring to FIG. 2, the system includes a ray tracing apparatus 100, an external memory 250, and an acceleration structure (AS) generator 200. Also, the ray tracing apparatus 100 includes a ray generation unit 110, a traversal (TRV) unit 120, an intersection test (IST) unit 130, and a shading unit 140.

The ray generation unit 110 generates a primary ray and rays derived from the primary ray. As described above with reference to FIG. 1, the ray generation unit 110 may generate the primary ray 40 from the viewpoint 10, and generate a secondary ray at a hit point of the primary ray 40 and an object. The secondary ray may be a reflected, refracted, or shadow ray generated at the hit point where the primary ray and the object intersect each other. Also, the ray generation unit 110 may generate a tertiary ray at a hit point of the secondary ray and another object. The ray generation unit 110 may continuously generate a ray until the ray does not intersect an object, or may generate a ray for a fixed number of times.

The TRV unit 120 receives information of a generated ray from the ray generation unit 110. Examples of the generated ray may include the primary ray and the rays (the secondary ray and the tertiary ray) derived from the primary ray. For example, when the generated ray is the primary ray, the TRV unit 120 may receive origin and direction information of the generated ray. When the generated ray is the secondary ray, the TRV unit 120 may receive origin and direction information of the secondary ray. An origin of the secondary ray is a starting point where the primary ray and an object intersect each other. An origin or a starting point may be represented via coordinates, and a direction may be represented via a vector.

The TRV unit 120 reads information of an AS from the external memory 250. The AS is generated by the AS generator 200, and the generated AS is stored in the external memory 250. The AS generator 200 generates an AS including location information of objects in a 3D space. The AS generator splits the 3D space in a hierarchical tree shape. The AS generator 200 may generate an AS in any form. For example, the AS generator 20 may generate an AS showing a relationship between objects in a 3D space by using a K-dimensional tree (KD-tree) or bounding volume hierarchy (BVH), as will be described in detail with reference to FIG. 3.

Figure 3:
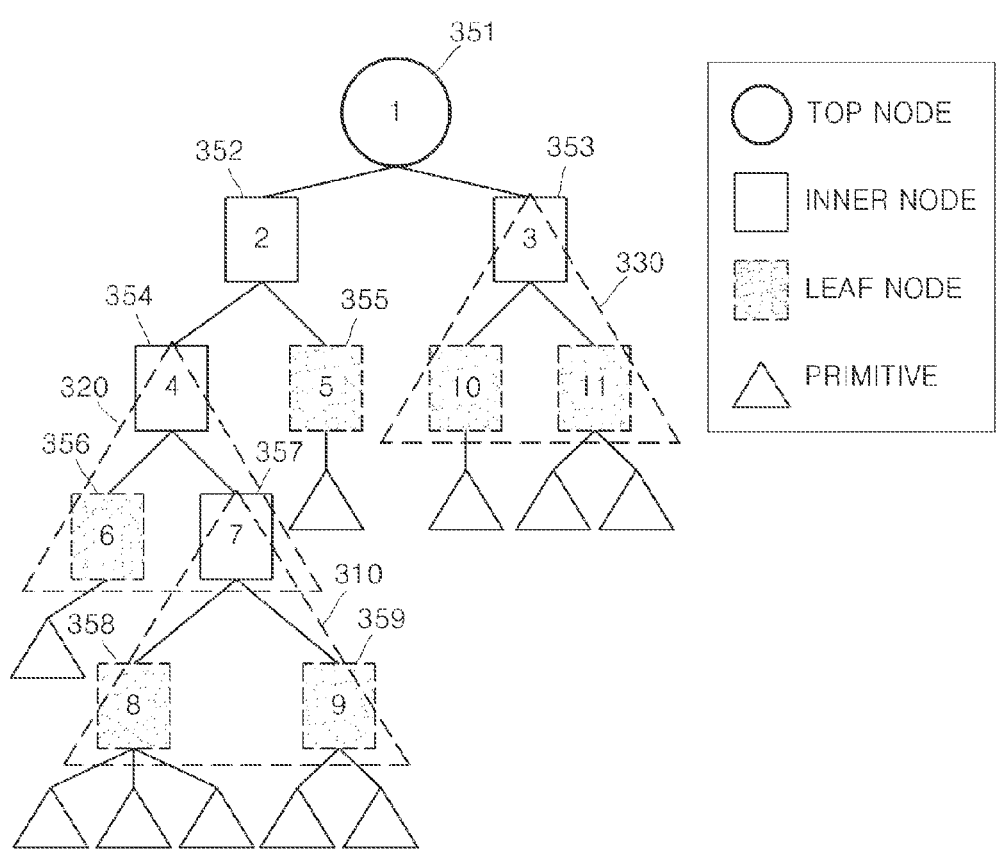
FIG. 3 is a diagram illustrating an example of an acceleration structure (AS).

FIG. 3 is a diagram illustrating an example of an AS. Hereinafter, for convenience of description, each node of the AS is denoted by a number. For example, a circular node 1 is a first node 351, a square node 2 is a second node 352, and a dotted square node 5 is a fifth node 355. The AS may include a root node or top node, an inner node, a leaf node, and a primitive.

In FIG. 3, the first node 351 is a root node. The root node is an uppermost node that does not have an upper node, and has a lower node only. For example, lower nodes of the first node 351 are the second node 352 and a third node 353, and no upper node of the first node 351 exists. The second node 352 is an inner node. The inner node has both an upper node and a lower node. For example, an upper node of the second node 352 is the first node 351, and lower nodes of the second node 352 are a fourth node 354 and the fifth node 355. An eighth node 358 is a leaf node. A leaf node is a lowermost node that does not have a lower node, and has an upper node only. For example, an upper node of the eighth node 358 is a seventh node 357, and a lower node of the eighth node 358 does not exist. Meanwhile, a leaf node includes primitives. For example, a sixth node 356 that is a leaf node includes one primitive, the eighth node 358 that is a leaf node includes three primitives, and a ninth node 359 that is a leaf node includes two primitives.

Referring back to FIG. 2, the TRV unit 120 traverses the read information of the AS to detect a leaf node where rays intersect.

The IST unit 130 receives information of the leaf node where the rays intersect from the TRV unit 120. The IST unit 130 reads information (geometry data) of primitives included in the received leaf node from the external memory 250. The IST unit 130 performs IST between the rays and the primitives by using the read information of the primitives. For example, the IST unit 130 may test which primitive among the primitives included in the leaf node is intersected by the ray. Accordingly, the IST unit 130 may detect the primitive where the ray intersects, and calculate a hit point where the detected primitive and the ray intersect. The calculated hit point may be output to the shading unit 140 in a coordinate form.

The shading unit 140 determines a color value of a pixel based on information of a hit point and properties of a material at the hit point. Alternatively, the shading unit 140 may determine a color value of a pixel by considering a basic color of a material at a hit point and an effect of a light source. For example, in the pixel A of FIG. 1, the shading unit 140 may determine the color value of the pixel A by considering effects of the primary ray 40, and the refracted ray 70, the reflected ray 60, and the shadow ray 50, which are secondary rays.

Meanwhile, the ray tracing apparatus 100 may receive data needed to perform ray tracing from the external memory 250. The external memory 250 may store the AS and/or the geometry data. The AS is generated by the AS generator 200, and stored in the external memory 250. Also, the geometry data indicates information of primitives. A primitive may be polygonal, such as triangular or rectangular, and geometry data may indicate information of apexes and locations of primitives included in an object. For example, when a primitive is triangular, geometry data may include apex coordinates of three points of a triangle, a normal vector, and/or a texture coordinate.

Figure 4:
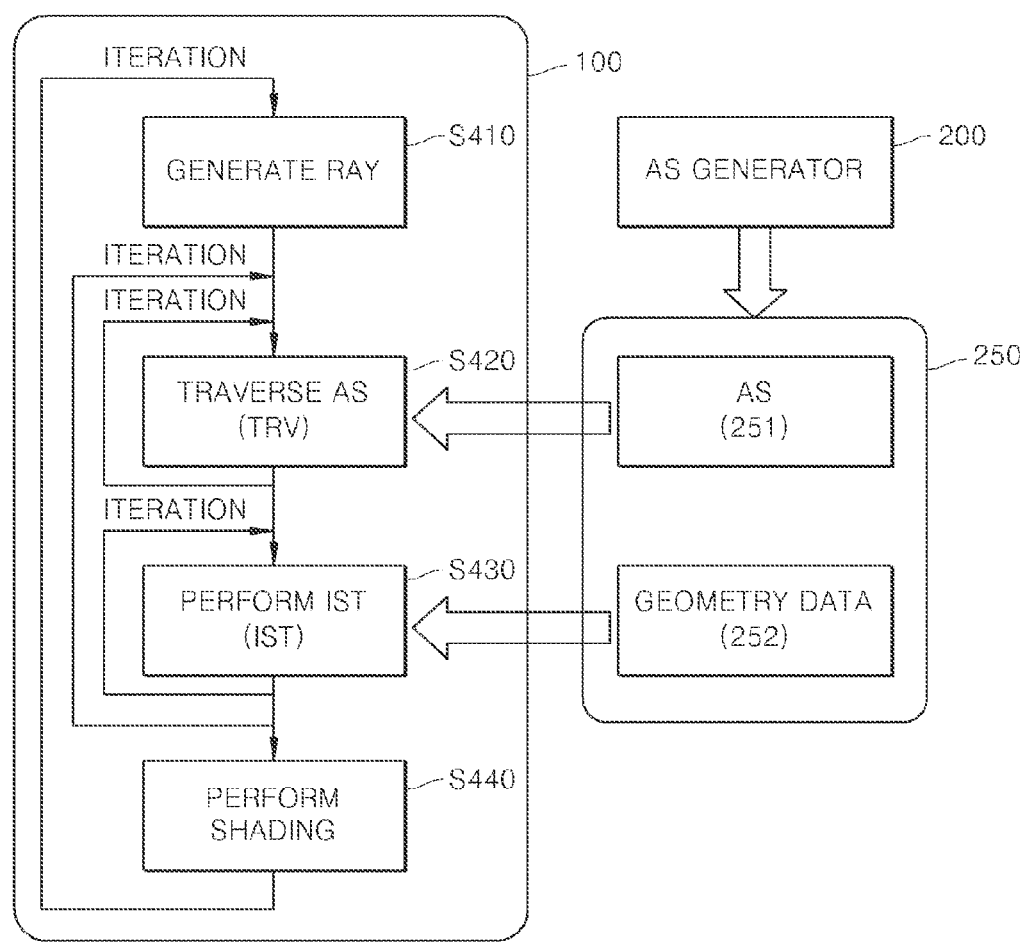
FIG. 4 is a diagram illustrating an example of a ray tracing method.

FIG. 4 is a diagram illustrating an example of a ray tracing method, which is performed by the ray tracing apparatus 100 of FIG. 2. Accordingly, descriptions of FIG. 2 may also apply to FIG. 4.

Referring to FIG. 4, in operation S410, the ray tracing apparatus 100 generates a ray. Examples of the ray include a primary ray generated from a viewpoint and rays derived from the primary ray.

In operation S420, the ray tracing apparatus 100 reads an AS 251 from the external memory 250, and traverses the AS 251 based on the generated ray. Accordingly, the ray tracing apparatus 100 detects a leaf node where the ray intersects. The ray tracing apparatus 100 may continuously traverse the AS 251 until the leaf node is detected.

For example, the ray tracing apparatus 100 may detect the leaf node by performing a ray-node IST. The ray tracing apparatus 100 may traverse the AS 251 along any one path, and if the ray does not intersect a leaf node on the path, the ray tracing apparatus 100 may traverse the AS 251 along another path. For example, referring to FIG. 3, the ray tracing apparatus 100 may start to traverse the AS from the second or third node 352 or 353 that is the lower node of the first node 351. If the AS is traversed from the second node 352, the ray tracing apparatus 100 may store information of the third node 353 in a separate memory.

The ray tracing apparatus 100 may determine whether the ray intersects the second node 352, and if the second node 352 and the ray intersect each other, may traverse any one of the fourth and fifth nodes 354 and 355 that are the lower nodes of the second node 352. When the ray tracing apparatus 100 determines whether the fourth node 354 and the ray intersect each other, the ray tracing apparatus 100 may store information of the fifth node 355 in the separate memory. If the fourth node 354 and the ray intersect each other, the ray tracing apparatus 100 may traverse any one of the sixth and seventh node 356 and 357 that are the lower nodes of the fourth node 354. When the ray tracing apparatus 100 determines whether the sixth node 356 and the ray intersect each other, the apparatus 100 may store information of the seventh node 357 in the separate memory. If the sixth node 356 and the ray intersect each other, the ray tracing apparatus 100 may detect the sixth node 356 as the leaf node.

As such, the ray tracing apparatus 100 may detect a leaf node by traversing the AS 251 in any one path, and may store information of nodes in other paths in a separate memory to traverse again from a most recently stored node after traversing the any one path. For example, referring to FIG. 3, after detecting the sixth node 356 as the leaf node, the ray tracing apparatus 100 may traverse the AS again form the seventh node 357 that is most recently stored. Accordingly, the ray tracing apparatus 100 does not traverse again from the top node after traversing one path, but traverses another path most adjacent to the path that has been traversed, thereby reducing an amount of operations.

Referring again to FIG. 4, in operation S430, the ray tracing apparatus 100 transmits information of the detected leaf node to the IST unit 130, and determines whether a primitive included in the detected leaf node intersects the ray. That is, the ray tracing apparatus 100 reads information (geometry data) 252 of primitives from the external memory 250, and performs an IST between the ray and the primitives by using the geometry data 252.

The ray tracing apparatus 100 determines which one of the primitives included in the leaf node detected by the TRV unit 120 is intersected by the ray. For example, if the detected leaf node includes three primitives (first through third primitives), the ray tracing apparatus 100 may perform ISTs between the first primitive and the ray, between the second primitive and the ray, and between the third primitive and the ray, so as to detect a primitive intersecting the ray. Accordingly, the ray tracing apparatus 100 detects the primitive intersecting the ray, and calculates a hit point where the detected primitive and the ray intersect each other.

In operation S440, the ray tracing apparatus 100 performs shading of a pixel based on the IST. In other words, the ray tracing apparatus 100 determines a color value of a pixel based on information of the hit point and properties of a material at the hit point.

After operation S440, the ray tracing apparatus 100 performs operation S410 again. That is, the ray tracing apparatus 100 performs operations S410 through S440 to perform shading on another pixel after performing shading on one pixel, and repeatedly performs operations S410 through S440 on each of all pixels forming a screen.

Figure 5:
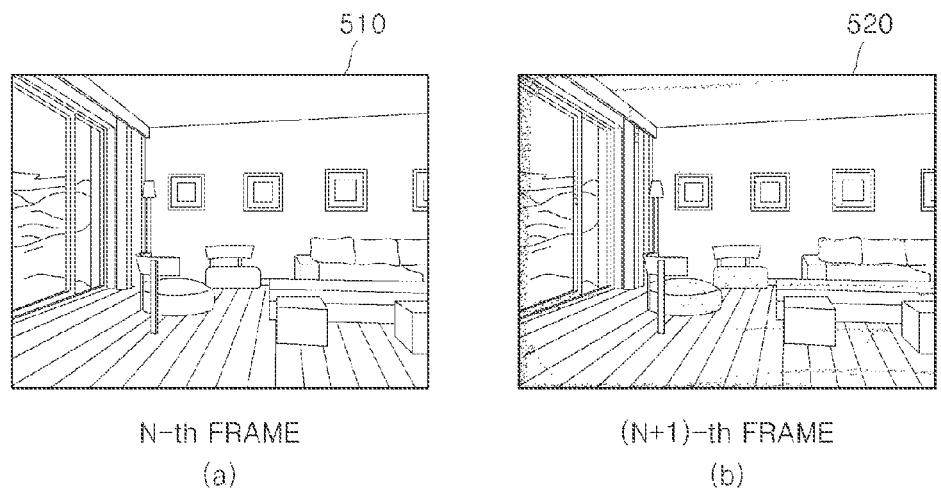
FIG. 5 is a diagram illustrating an example of rendering images of consecutive frames.

FIG. 5 is a diagram illustrating an example of rendering images of consecutive frames. Referring to FIG. 5, section (a) illustrates a rendering image corresponding to an N-th frame (first frame) 510, and section (b) illustrates a rendering image corresponding to an N+1-th frame (second frame) 520.

In a general graphic process, rendering images of consecutive frames have considerable similarity because adjacent frames are quickly, consecutively reproduced with a small difference in order to create a natural animation effect. For example, comparing the first and second frames 510 and 520 of FIG. 5, pixels of the first frame 510 and pixels of the second frame 520 are the same except for a region with slashes in the second frame 520. Thus, overall, the first and second frames 510 and 520 are very similar.

Accordingly, the ray tracing apparatus 100 may perform rendering on the second frame 520 by using a result of rendering the first frame 510. For example, when an origin and a direction of a first ray in the first frame 510 and those of a second ray in the second frame 520 are similar, the ray tracing apparatus 100 may use a traversal result of the first ray while traversing the second ray. In more detail, before the TRV unit 120 of the apparatus 100 traverses the second ray, the TRV unit 120 may firstly traverse a node cluster and a leaf node where the first ray intersects. Also, the IST unit 130 of the ray tracing apparatus 100 may firstly perform an IST on a primitive where the first ray intersects before performing an IST on the second ray.

Figure 6:
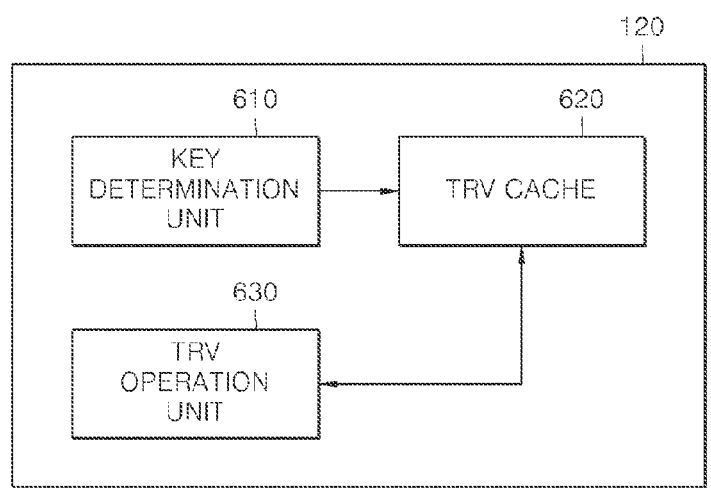
FIG. 6 is a block diagram illustrating an example of a traversal (TRV) unit.

FIG. 6 is a block diagram illustrating an example of the TRV unit 120. Referring to FIG. 6, the TRV unit 120 includes a key determination unit 610, a TRV operation unit 630, and a TRV cache 620.

The key determination unit 610 extracts a feature of a received ray to determine a key of the received ray according to the extracted feature. The feature of the received ray may include origin and direction information of the received ray. The key determination unit 610 searches a database (DB) for the key corresponding to the origin and direction information of the received ray. A method of determining a key of a ray will be described in detail below with reference to FIG. 7.

Figure 7:
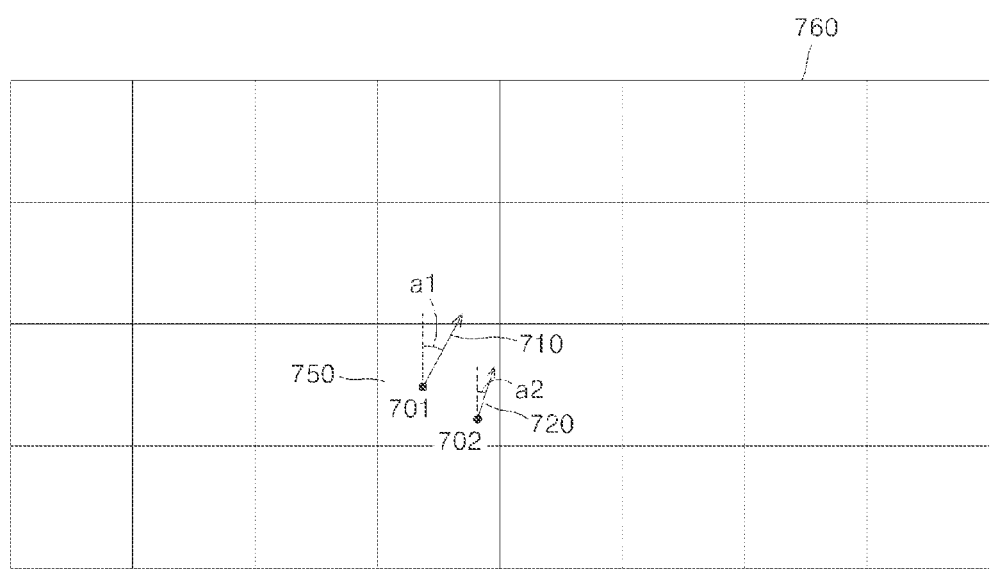
FIG. 7 is a diagram illustrating an example of a method of determining a key of a ray.

FIG. 7 is a diagram illustrating an example of a method of determining a key of a ray. Referring to FIG. 7, a ray may be represented by a vector. For example, a first ray is represented by a first ray vector 710 having a first origin 701 and a first direction, and a second ray is represented by a second ray vector 720 having a second origin 702 and a second direction. Accordingly, an origin of a ray may be represented by coordinates, and a direction of the ray may be represented by an angle between a reference line and a ray vector. The key determination unit 610 may determine rays whose origins and directions are within a range as one group, and assign the same key to rays in the same group. In order to classify rays into groups, a region 760 where rays exist is divided into equal sizes to form a predetermined number of cells. For example, as shown in FIG. 7, the region 760 includes 32 cells.

An angle range (0° to 360°) formed by a reference line and ray vectors is split into regular angles to set a predetermined number of sections. For example, if an angle of 360° is split by 45°, a first section is from 0° to 45°, a second section is from 45° to 90°, and a third section is from 90° to 135°, and so on, thereby setting 8 sections. Then, if origins of rays are in the same cell and directions (angles formed by the reference line and the ray vectors) of the rays are in the same section, the rays may be in the same group.

For example, as shown in FIG. 7, when the first origin 701 of the first ray vector 710 and the second origin 702 of the second ray vector 720 are in a same cell 750, and the direction (angle a1 formed by the reference line and the first ray vector 710) of the first ray vector 710 and the direction (angle a2 formed by the reference line and the second ray vector 720) of the second ray vector 720 are in the first section (0° to 45°), the first ray and the second ray may be in the same group. Accordingly, keys of the first and second rays may have the same value.

Meanwhile, as shown in FIG. 7, when the number of sections of origins is 32 (32 cells) and the number of sections of directions is 8 (first through eighth sections), the key determination unit 610 may store 256 (=32×8) pieces of section data and corresponding keys in a DB. The DB may have a structure of a hash table. Accordingly, the key determination unit 610 may determine a section of the received ray and a key corresponding to the determined section as a key of the received ray.

Referring again to FIG. 6, the TRV cache 620 may include a tag unit and a data unit, wherein the tag unit may store tag data indicating a key of a ray, and the data unit may store AS traversal data of a ray that corresponds to the tag data. The tag data may indicate a key of a previous ray. For example, when first and second rays that are not similar have been traversed before, first tag data indicating a key of the first ray and second tag data indicating a key of the second ray may be stored in the tag unit.

Also, first AS traversal data indicating a result of traversing the first ray and second AS traversal data indicating a result of traversing the second ray may be stored in the data unit. AS traversal data of a previous ray may include at least one of data of a node cluster intersecting the previous ray, data of a leaf node intersecting the previous ray, and data of a primitive intersecting the previous ray based on traversing the previous ray. The node cluster, in the AS, includes a leaf node intersecting the pervious ray, an upper node immediately above the leaf node, and one or more lower nodes of the upper node. For example, referring to FIG. 3, if the previous ray intersects the eighth node 358 that is a leaf node, a node cluster 310 may include the seventh node 357, the eighth node 358, and the ninth node 359. Also, if the previous ray intersects the sixth node 356 that is a leaf node, a node cluster 320 may include the fourth node 354, the sixth node 356, and the seventh node 357.

The TRV cache 620 compares the key of the received ray with a plurality of pieces of tag data to determine whether AS traversal data of a previous ray having the same key as the received ray is stored in the TRV cache 620. If the key of the received ray matches any one of the plurality of pieces of tag data, it is determined that a cache hit occurred, and if the key of the received ray does not match any one of the plurality of pieces of the tag data, it is determined that a cache miss occurred.

When it is determined that a cache hit occurred, the TRV operation unit 630 performs AS traversal with the received ray based on AS traversal data read from the TRV cache 620. In this case, when the AS traversal data is of a node cluster, the TRV operation unit 630 determines whether the received ray intersects nodes included in the node cluster, and the AS traversal may be performed from an uppermost node of the nodes in the node cluster. Alternatively, when the AS traversal data is of a leaf node, the TRV operation unit 630 determines whether the received ray intersects the leaf node.

When it is determined that a cache miss occurred, the TRV operation unit 630 performs AS traversal with the received ray to determine which leaf node in the AS intersects the received ray. In this case, as described above with reference to FIG. 4, the ray-node IST may be performed on the nodes in the AS to detect the leaf node.

Figure 8:
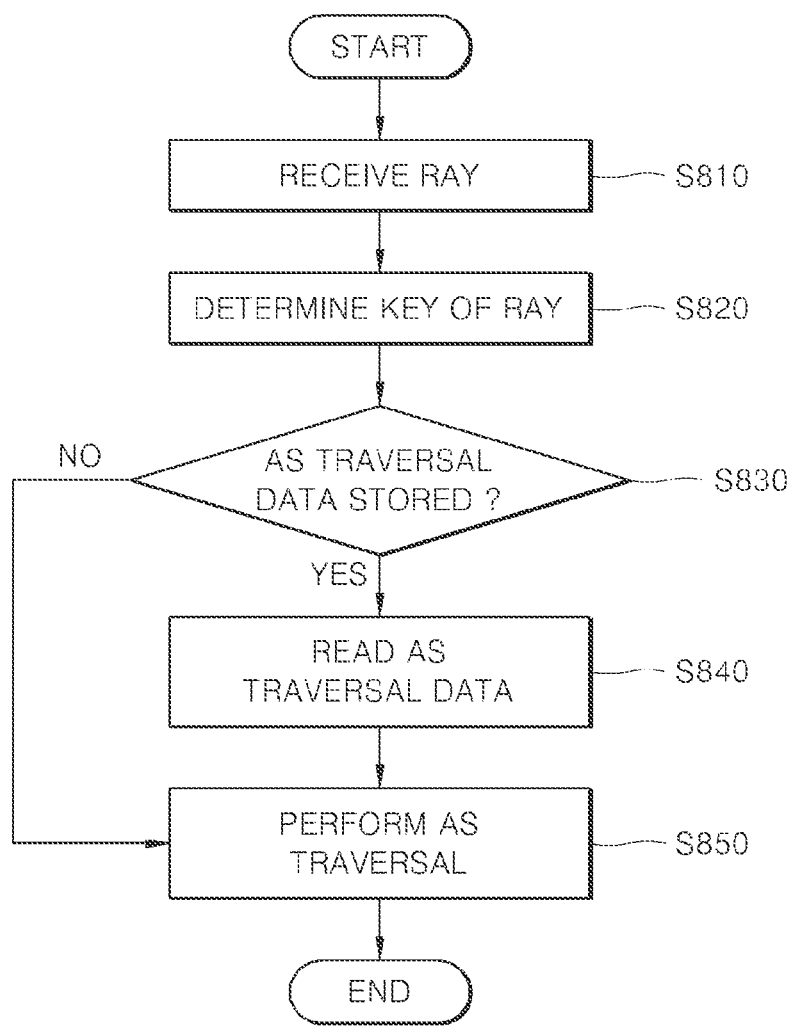
FIG. 8 is a flowchart illustrating an example of a ray tracing method.

FIG. 8 is a flowchart illustrating an example of a ray tracing method. Referring to FIG. 8, in operation S810, the ray tracing apparatus 100 generates and receives a ray.

In operation S820, the ray tracing apparatus 100 extracts a feature of the received ray, and determines a key of the received ray according to the extracted feature. The extracted feature may include origin and direction information of the received ray, and the key of the ray may be determined according to the origin and direction information of the received ray. In detail, the ray tracing apparatus 100 may compare the origin and direction information of the received ray with a plurality of pieces of group information stored in a DB to determine a group to which the received ray belongs, and determine a key corresponding to the determined group as the key of the received ray.

Figure 9:
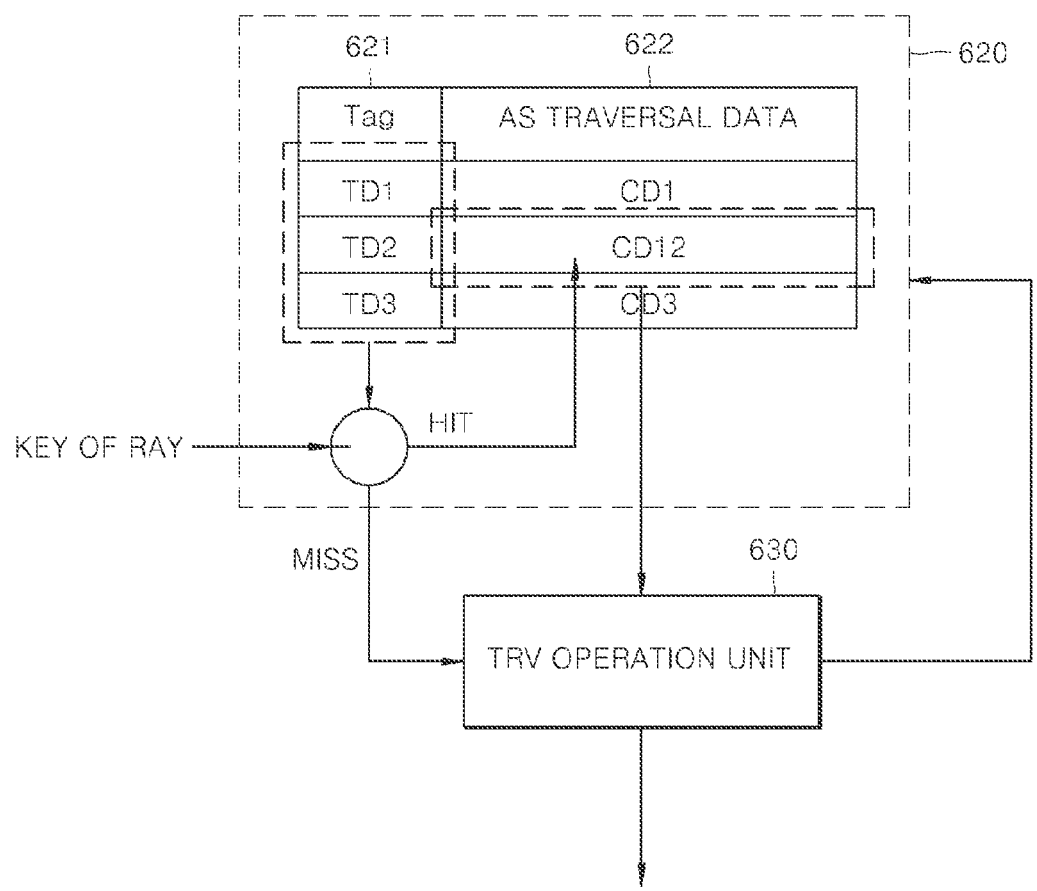
FIG. 9 is a diagram illustrating an example of the method of FIG. 8.

In operation S830, the ray tracing apparatus 100 determines whether AS traversal data of a previous ray having the same key as the received ray is stored in the TRV cache 620. For example, as shown in FIG. 9, the ray tracing apparatus 100 compares a key of a ray with each of first through third tag data TD1, TD2, and TD3 of a tag unit 621 of the TRV cache 620 to determine whether the key of the ray matches any of the first through third tag data TD1, TD2, and TD3. When the key of the ray is determined to match any one of the first through third tag data TD1, TD2, and TD3, the ray tracing apparatus 100 determines that a cache hit occurred, and continues in operation S840. When the key of the ray is determined to not match any one of the first through third tag data TD1, TD2, and TD3, the ray tracing apparatus 100 determines that a cache miss occurred, and continues in operation S850.

In operation S840, the ray tracing apparatus 100 reads the AS traversal data. For example, as shown in FIG. 9, when the key of the ray and the second tag data TD2 match each other, the ray tracing apparatus 100 outputs second cache data (AS traversal data) CD2 corresponding to the tag data TD2 from an AS traversal data unit 622 of the TRV cache 620 to the TRV operation unit 630.

When the cache hit is determined to have occurred, in operation S850, the ray tracing apparatus 100 performs AS traversal on the received ray based on the read AS traversal data. For example, when the read AS traversal data is of a node cluster, the ray tracing apparatus 100 may determine whether the received ray intersects nodes included in the node cluster from an uppermost node of the nodes included in the node cluster. Alternatively, when the read AS traversal data is of a leaf node, the ray tracing apparatus 100 may determine whether the received ray intersects the leaf node.

On the other hand, when the cache miss is determined to have occurred, in operation S850, the ray tracing apparatus 100 performs AS traversal on the received ray. In this case, as described above with reference to FIG. 4, the ray tracing apparatus 100 may perform the ray-node IST on the nodes in the AS to detect the leaf node.

Meanwhile, referring to FIG. 9, the ray tracing apparatus 100 stores the key of the received ray in the tag unit 621 of the TRV cache 620, and stores a result of performing the AS traversal in a region of the data unit 622 of the TRV cache 620 that corresponds to the stored key of the received ray in the tag unit 621. For example, the ray tracing apparatus 100 may perform the AS traversal with the received ray to detect a node cluster and/or a leaf node that intersect the received ray, and store data of the detected node cluster and/or leaf node.

Figure 10:
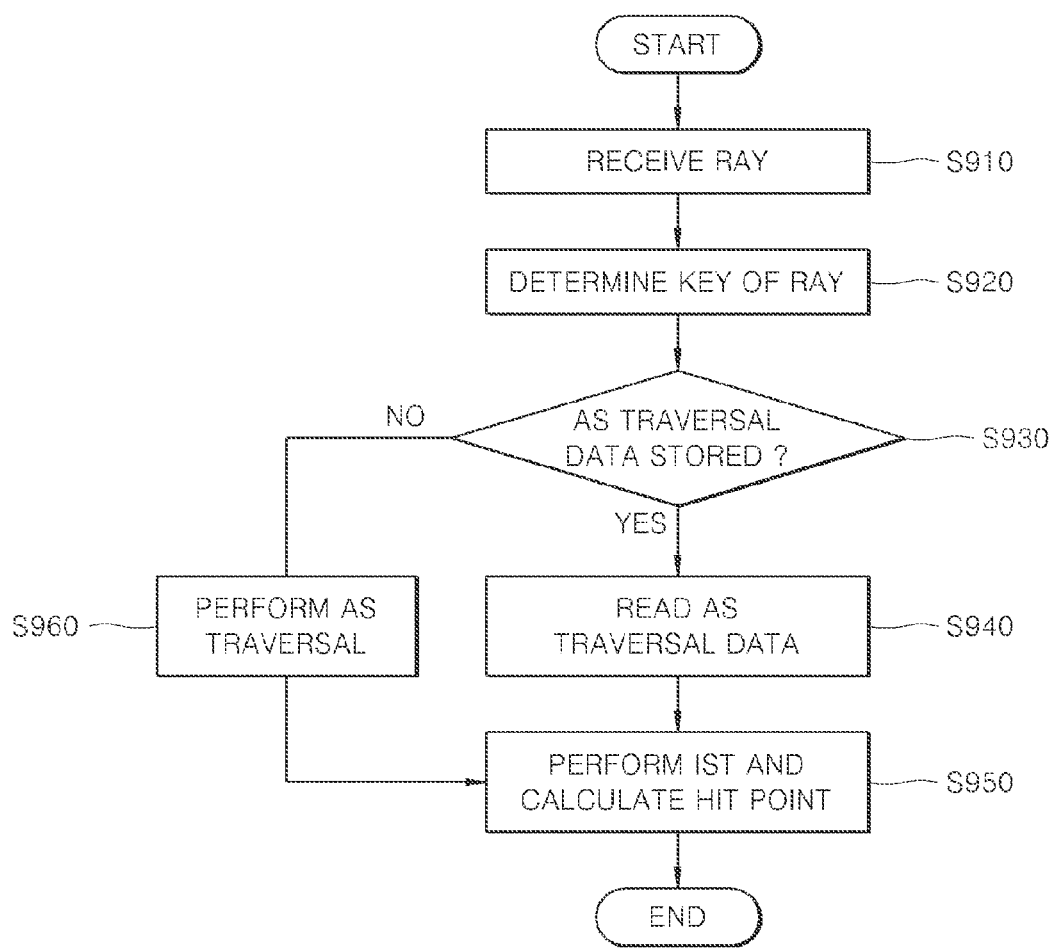
FIG. 10 is a flowchart illustrating another example of a ray tracing method.

FIG. 10 is a flowchart illustrating another example of a ray tracing method. Since operations S910 through S930 of FIG. 10 are respectively the same as operations S810 through S830 of FIG. 8, details thereof are not repeated.

When the cache hit is determined to have occurred, i.e., when the AS traversal data of the previous ray having the same key as the received ray is determined to be stored in the TRV cache 620, in operation S940, the ray tracing apparatus 100 reads the AS traversal data.

When the read AS traversal data is of a primitive intersecting the previous ray, in operation S950, the ray tracing apparatus 100 performs an IST to determine whether the received ray intersects the primitive, and if so, calculates a hit point of the received ray and the primitive.

On the other hand, when the cache miss is determined to have occurred, i.e., when the AS traversal data of the previous ray having the same key as the received ray is determined to be not stored in the TRV cache 620, in operation S960, the ray tracing apparatus 100 performs AS traversal on the received ray. In this case, as described above with reference to FIG. 4, the ray tracing apparatus 100 may perform the ray-node IST on the nodes in the AS to detect the leaf node.

The examples of the ray tracing apparatus described may store a result of traversing a previous ray in a TRV cache, and when a ray similar to the previous ray is received, the ray tracing apparatus may use the result stored in the TRV cache. As such, by using a ray traversal result of a previous frame on a current frame according to similarity between the frames, a number of operations needed for ray tracing of the current frame may be reduced.

While traversing a received ray, a node where a previously traversed similar ray intersects may be firstly traversed to quickly traverse an AS. Also, while performing an IST on the received ray, the IST may be firstly performed on a primitive where the previously traversed similar ray intersects to quickly process the ray tracing. Accordingly, a process capacity and process speed of a ray tracing apparatus may be improved.

The various units, elements, and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A ray tracing method comprising:
    extracting feature information of a received ray comprising an origin and a direction of the received ray;
    determining a key of the received ray among a plurality of keys for a current frame based on the extracted feature information, wherein each of the plurality of keys is associated with at least one ray for the current frame, respectively;
    determining whether acceleration structure traversal data of a previous ray of a previous frame, that is similar to the received ray of the current frame, is stored in a traversal cache based on the key; and
    reading the stored acceleration structure traversal data, and performing image rendering based on the read acceleration structure traversal data, based on a result of the determining involving the acceleration structure traversal data, which comprises determining whether a cache hit or a cache miss occurs based on whether tag data indicating an origin and a direction of the received ray matches tag data indicating an origin and a direction of the previous ray.

2. The ray tracing method of claim 1, wherein the plurality of keys are keys of a hash table database, and the ray tracing method further comprising:
    determining that the previous ray is similar to the received ray based on the key.

3. The ray tracing method of claim 1, wherein the determining of the key comprises:
    determining a group to which the received ray belongs by searching, based on the extracted feature information, a database in which information of groups set based on feature information of rays, and keys of the groups, are stored, and
    determining a key of the determined group as the key of the received ray.

4. The ray tracing method of claim 3, wherein:
    the information of the groups comprises an origin and a direction of each of the rays; and
    the determining of the key comprises determining the group to which the received ray belongs by comparing the origin and the direction of the received ray with the origin and the direction of each of the rays.

5. The ray tracing method of claim 1, wherein:
    the determining of whether the acceleration structure traversal data is stored comprises comparing the key of the received ray with the tag data stored in the traversal cache and indicating a key of a ray; and
    the reading comprises, in response to the tag data matching the key of the received ray, reading the acceleration structure traversal data corresponding to the matching tag data.

6. The ray tracing method of claim 1, wherein the acceleration structure traversal data comprises at least one of data of a node cluster where a previous ray intersects, data of a leaf node where the previous ray intersects, and data of a primitive where the previous ray intersects.

7. The ray tracing method of claim 6, wherein, in response to the acceleration structure traversal data comprising the data of the node cluster, the image rendering comprises detecting a leaf node where the received ray intersects by traversing nodes included in the node cluster.

8. The ray tracing method of claim 6, wherein, in response to the acceleration structure traversal data comprising the data of the leaf node, the rendering comprises testing whether the received ray intersects the leaf node.

9. The ray tracing method of claim 6, further comprising, in response to the acceleration structure traversal data comprising the data of the primitive, transmitting the data of the primitive to an intersection test unit.

10. The ray tracing method of claim 6, wherein, in response to the acceleration structure traversal data comprising the data of the primitive, the rendering comprises testing whether the received ray intersects the primitive.

11. A ray tracing apparatus comprising:
    one or more processors configured to extract feature information of a received y comprising an origin and a direction of the received ray;
    determine a key of the received ray among a plurality of keys for a current frame, based on the extracted feature information, wherein each of the plurality of keys is associated with at least one ray for the current frame, respectively;
    determine whether acceleration structure traversal data of a previous ray of a previous frame, that is similar to the received ray of the current frame, is stored in a traversal cache based on the key; and
    read the stored acceleration structure traversal data, and perform acceleration structure traversal with the received ray based on the read acceleration structure traversal data, based on a result of the determination involving the acceleration structure traversal data, which comprises determining whether a cache hit or a cache miss occurs based on whether tag data indicating an origin and a direction of the received ray matches tag data indicating an origin and a direction of the previous ray.

12. The ray tracing apparatus of claim 11, wherein the plurality of keys are keys of a hash table database, and the one or more processors is further configured to:
determine that the previous ray is similar to the received ray based n the key.

13. The ray tracing apparatus of claim 11, further comprising:
a database in which information of groups set based on feature information of rays, and keys of the groups, are stored; and
wherein the one or more processors is configured to
determine a group to which the received ray belongs by searching the database based on the extracted feature information, and
determine a key of the determined group as the key of the received ray.

14. The ray tracing apparatus of claim 13, wherein:
the information of the groups comprises an origin and a direction of each of the rays; and
the one or more processors is configured to determine the group to which the received ray belongs by comparing the origin and the direction of the received ray with the origin and the direction of each of the rays.

15. The ray tracing apparatus of claim 11, wherein:
the one or more processors is configured to
store the tag data indicating a key of a ray, and acceleration structure traversal data corresponding to the tag data,
compare the key of the received ray with the stored tag data; and
the one or more processors is configured to read the acceleration structure traversal data corresponding to the matching tag data in response to the tag data matching the key of the received ray.

16. The ray tracing apparatus of claim 11, wherein the acceleration structure traversal data comprises at least one of data of a node cluster where the previous ray intersects, data of a leaf node where the previous ray intersects, and data of a primitive where the previous ray intersects.

17. The ray tracing apparatus of claim 16, wherein, in response to the acceleration structure traversal data comprising the data of the node cluster, the one or more processors is configured to traverse nodes included in the node cluster to detect a leaf node where the received ray intersects.

18. The ray tracing apparatus of claim 16, wherein, in response to the acceleration structure traversal data comprising the data of the leaf node, the one or more processors is configured to test whether the received ray intersects the leaf node.

19. The ray tracing apparatus of claim 16, wherein the one or more processors is further configured to test whether the received ray intersects the primitive in response to the acceleration structure traversal data comprising the data of the primitive.

20. The ray tracing method of claim 1, further comprising:
detecting a leaf node by traversing a most recently stored node by traversing a path most adjacent to a traversed path without traversing again from a top node, in response to traversing the path.

21. The ray tracing method of claim 1, further comprising:
assigning a same key to rays whose origins and directions are within a range into a group, the directions being separated by angles of a predetermined increment between a reference line and a ray vector.

22. The ray tracing method of claim 1, further comprising:
performing an acceleration structure traversal on the received ray without reading the acceleration structure traversal data in response to determining a cache miss has occurred.

23. A non-transitory computer-readable storage medium storing instructions that, when read by a processing device, cause the processing device to implement a ray tracing method comprising:
extracting feature information of a received ray comprising an origin and a direction of the received ray;
determining a key of the received ray among a plurality of keys for a current frame based on the extracted feature information, wherein each of the plurality of keys is associated with at least one ray for the current frame, respectively;
determining whether acceleration structure traversal data of a previous ray of a previous frame, that is similar to the received ray of the current frame, is stored in a traversal cache; and
reading the stored acceleration structure traversal data, and performing image rendering based on the read acceleration structure traversal data, based on a result of the determining involving the acceleration structure traversal data, which comprises determining whether a cache hit or a cache miss occurs based on whether tag data indicating an origin and a direction of the received ray matches tag data indicating an origin and a direction of the previous ray.

* * * * *